(No Model.)
C. P. ELIESON.
POWER TRANSMITTER FOR USE UPON CARRIAGES, &c.
No. 595,051. Patented Dec. 7, 1897.
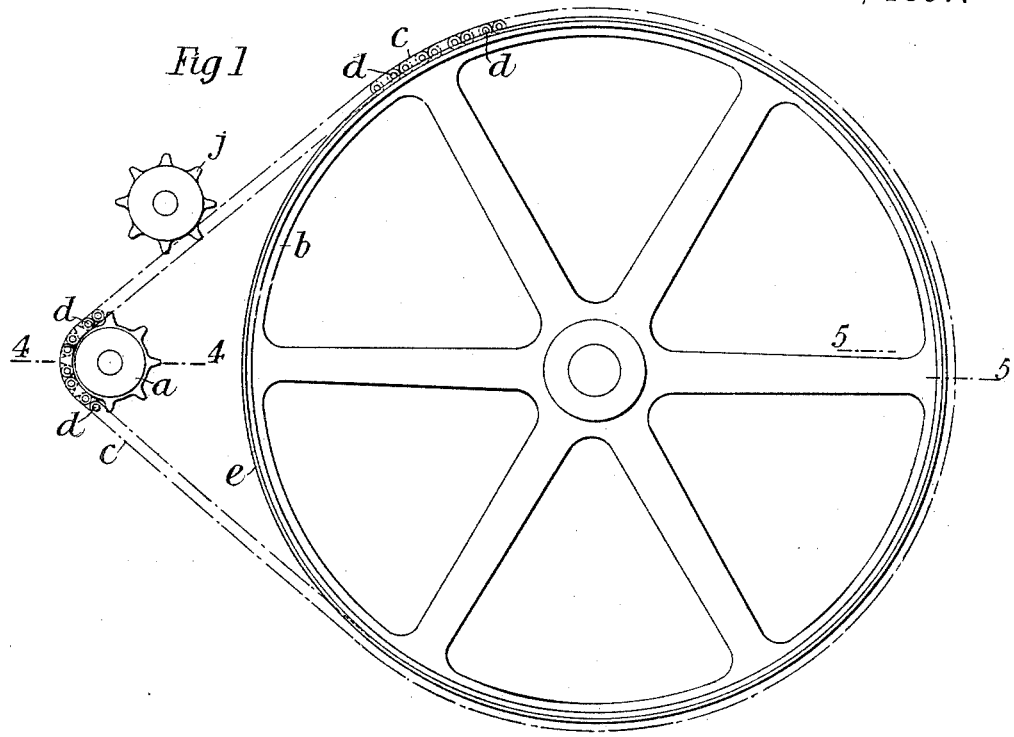
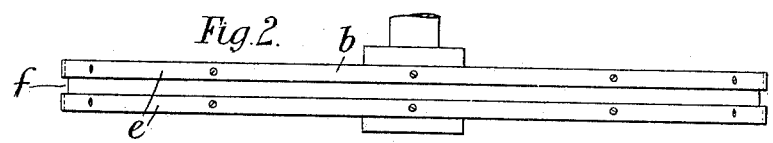
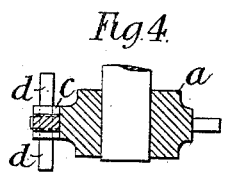 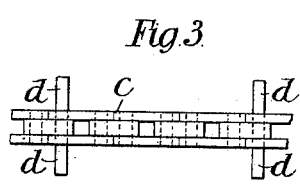 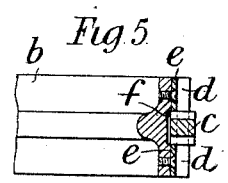
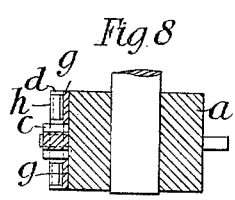 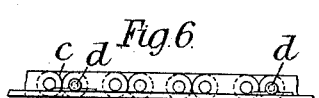 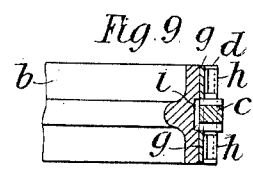
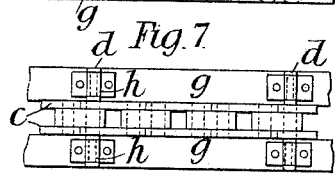
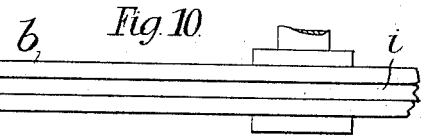
Witnesses. Inventor.

UNITED STATES PATENT OFFICE.

CHAIMSONOVITZ PROSPER ELIESON, OF LONDON, ENGLAND.

POWER-TRANSMITTER FOR USE UPON CARRIAGES, &c.

SPECIFICATION forming part of Letters Patent No. 595,051, dated December 7, 1897.

Application filed March 15, 1897. Serial No. 627,650. (No model.)

*To all whom it may concern:*

Be it known that I, CHAIMSONOVITZ PROSPER ELIESON, a subject of the Queen of Great Britain, residing at London, England, have invented new and useful Improvements in Power-Transmitters for Use upon Carriages and for other Purposes, of which the following is a specification.

My invention relates to power-transmitting mechanism chiefly designed for use upon road-carriages of the kind known as "autocars," but also applicable for transmitting motion from one shaft to another for other purposes.

It is well known that when a self-propelled road-carriage is moving out of the straight line one of the driven traveling wheels moves faster or slower than the other. While the chain is the most simple medium for transmitting the motion of the motor-shaft to the driving-axle, it has the defect that unless special compensating gear is provided a greatly-increased strain is thrown upon the gearing, owing to the slip which must take place between the traveling wheels and the ground. Belt-gearing tends to minimize this difficulty, owing to the slip which takes place between the belt and the driving-pulley. Still its use is practically inadmissible, owing to the fact that, the driving-motor running at a relatively high speed compared with the traveling wheel-axle, the pulley on the driving-shaft is much smaller than that on the driven shaft, so that by reason of the differences in the areas of the pulleys with which the belt is in contact the slip takes place on the pulley of the motor-shaft rather than on the pulley on the traveling axle.

Now the object of my invention is to obtain all the advantages of belt transmission, as regards the provision for slipping, with the advantages of chain transmission, in so far as regards non-slipping upon the motor-shaft. To effect this end, I make use of a transmitter which is in positive connection with a pinion or pulley on one shaft—say the motor-shaft—and in frictional connection with the pulley on the driven shaft—say the traveling axle. In one form of apparatus the transmitter is a chain having a series of lateral pins or projections, the links of the chain being engaged by the teeth of a sprocket-wheel on one shaft, while the lateral pins frictionally engage with a yielding surface on the plain pulley on the other shaft. In another form of apparatus I insert the chain in the center of a belt, the teeth engaging with the chain being placed in the center of the width of the pulley on the motor-shaft. In either case a recess is formed in the center of the plain pulley to afford space for the chain-links to run without coming into contact with the surface of the pulley.

To enable my invention to be fully understood, I will describe the same by reference to the accompanying drawings, in which—

Figure 1 is a side elevation illustrating the arrangement of driving mechanism in accordance with my invention. Fig. 2 is a plan view of the plain wheel or pulley. Fig. 3 is a plan view of a piece of the driving-chain drawn to a larger scale than Fig. 1. Fig. 4 is a section on the line 4 4, Fig. 1, drawn to an enlarged scale; and Fig. 5 is a section on the line 5 5, Fig. 1, drawn to the same scale. Figs. 6 and 7 are a side elevation and plan, respectively, illustrating a modified form of transmitter; and Figs. 8 and 9 are views similar to Figs. 4 and 5, respectively, of the pulleys for use in connection with this transmitter. Fig. 10 is a plan view of a driven wheel drawn to the same scale as the wheel shown in Fig. 2 and adapted for use with the chain shown in Figs. 7, 8, and 9.

Similar letters of reference indicate corresponding parts in the several figures.

$a$ is the sprocket-pinion on the driving-shaft, and $b$ is the plain wheel or pulley on the driven shaft.

$c$ is the driving-chain, which runs around the pulley $b$ and is in engagement with the teeth of the sprocket-pinion $a$, so that the said chain is positively driven.

$d\ d$ are pins projecting from the sides of the chain, the said pins being of a length approximately corresponding with the width of the driven pulley.

$e\ e$ are strips of leather or other yielding material arranged around the periphery of the wheel $b$ at the sides thereof, so as to form a channel $f$ between them, the said channel serving for the chain proper to run in in order that the pins $d\ d$ may come into frictional contact with the yielding strips, as shown in Fig. 5.

With the arrangement hereinbefore described it will be obvious that the motion of the driving-shaft will be communicated through the sprocket-wheel $a$ to the transmitter without any liability of the latter slipping thereon, while as the pulley $b$ is plain—that is to say, unprovided with sprocket-teeth—it will be obvious that the power which is transmitted from the driving-pinion through the chain will be received by the driven wheel through the pins $d\ d$, which are free to slip upon the surface of the said driven wheel.

In the modification of my invention shown in Figs. 6 to 10 the pins $d\ d$ carry leather bands or belts $g\ g$, the said bands being secured to the pins by any suitable means in such a manner that they will run in contact with the surface of the wheel $b$, which in this case is not covered with a yielding material. As shown, the said bands are secured to the pins by means of small sockets $h\ h$, into which the pins are inserted and which are secured to the said bands by rivets. In order to keep the bands $e\ e$ taut upon the pulley, the sprocket-wheel $a$ is made wide enough to allow of the said bands running around the same in a manner which is clearly shown in Fig. 8, or loose pulleys may be used for the purpose.

The driven wheel $b$ is recessed on the periphery at that part adjacent to which the chain $c$ runs, as indicated at $i$ in Figs. 9 and 10. It is to be understood, however, that such recessing is not essential.

In order to retain my transmitter at the required tension, I sometimes combine therewith a loose sprocket-wheel, such as that indicated at $j$, Fig. 1, which is adapted to be moved at will toward or away from the transmitter to give the latter more or less grip upon the pulley, as required.

Having now particularly described and ascertained the nature of my said invention and in what manner the same is to be performed, I declare that what I claim is—

1. A power-transmitting device comprising a sprocket-chain having its edges provided with lateral projections adapted to frictionally engage plain portions of a pulley, substantially as described.

2. In power-transmitting mechanism, the combination with a wheel provided with sprocket-teeth and a pulley having its periphery provided with a central annular recess and lateral plain portions, of a sprocket-chain adapted to engage the said sprocket-teeth and the recess of the said pulley and provided with laterally-projecting devices for frictionally engaging the plain portions of said pulley, substantially as described.

CHAIMSONOVITZ PROSPER ELIESON.

Witnesses:
G. F. REDFERN,
JOHN E. BOUSFIELD.